(No Model.)
A. RIPPIEN.
TOOL HOLDER.
No. 366,508. Patented July 12, 1887.
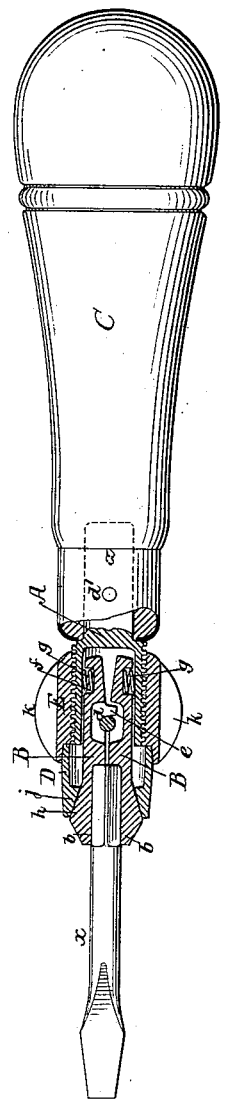
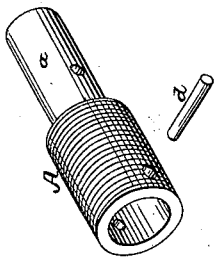
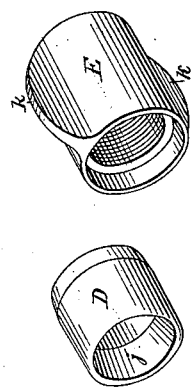
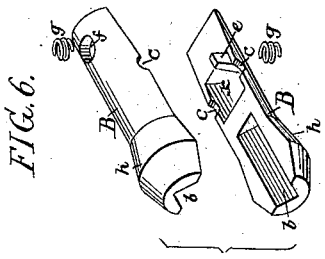
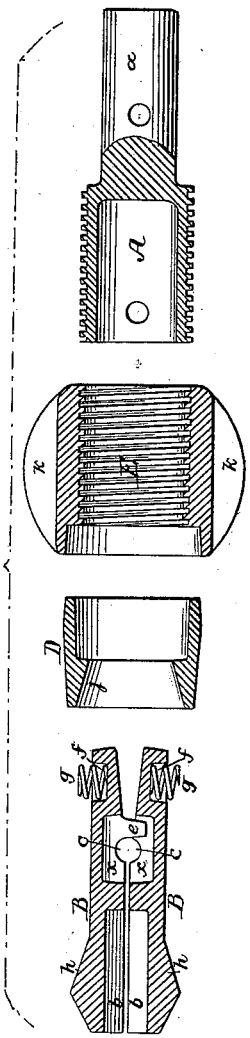
Witnesses:
Hamilton D. Turner.
David L. Williams.
Inventor:
Adolph Rippien
by his Attorneys
Howson & Sons

UNITED STATES PATENT OFFICE.

ADOLPH RIPPIEN, OF READING, PENNSYLVANIA.

TOOL-HOLDER.

SPECIFICATION forming part of Letters Patent No. 366,508, dated July 12, 1887.

Application filed November 29, 1886. Serial No. 220,140. (No model.)

*To all whom it may concern:*

Be it known I, ADOLPH RIPPIEN, a citizen of the United States, residing at Reading, Berks county, Pennsylvania, have invented certain Improvements in Tool-Holders, of which the following is a specification.

My invention relates to holders especially adapted for small tools, the object of my invention being to construct such a tool-holder so that it can be cheaply made and quickly put together, and so that the parts will not be subjected to excessive wear.

In the accompanying drawings, Figure 1 is a longitudinal section of my tool-holder with the tool and part of the handle in elevation. Fig. 2 is an enlarged section showing the main parts of the tool-holder detached from each other; and Figs. 3, 4, 5, and 6 are perspective views of the detached parts.

A is a hollow shell, which receives the inner ends of the jaws B B, and has an external screw-thread, as shown in Figs. 2 and 3, this shell having a shank, $a$, which extends into an orifice in the handle C, and is preferably secured thereto by a pin, $d'$, as shown in Fig. 1.

The jaws B B are of the peculiar form shown in Figs. 2 and 6, and are both alike, so that they can be cast from the same pattern. Each jaw has a recess, $b$, for the reception of the stem of the tool, and in each jaw, back of the recess $b$, is a recess, $x$, in the opposite walls of which are semicircular recesses $c$, which, when the jaws are placed together, form openings for the reception of a transverse pin, $d$, driven through the shell A, said pin thus acting as a pivot for the jaws and preventing the longitudinal withdrawal of the same from the shell. The semicircular openings obviate the necessity of drilling the jaws for the reception of the pivot-pin. Each jaw has back of the recess $c$, on one side, a small projection, $e$, as shown in Fig. 2, these projections steadying the jaws by keeping them laterally in line with each other, and also aiding in retaining the jaws in the shell.

Near the rear end of each jaw is a recess, $f$, for the reception of a small spring, $g$, as shown in Figs. 1 and 6. These springs bear against the interior of the shell A, and force the rear ends of the jaws B together, thus spreading the outer ends of the jaws apart. The jaws have external beveled shoulders, against which acts a sleeve, D, having a correspondingly-beveled internal shoulder, $j$, as shown in Figs. 1 and 2. This sleeve is loose, so far as regards radial movement of its front end, and hence will adapt itself to the shoulders $h$ of the jaws, a nut adapted to the thread on the shell A acting on the rear end of the sleeve D, and serving as a means of projecting the same.

I prefer to make the rear end of the sleeve D conical for adaptation to the conical end of the threaded nut E, in order to insure an accurate joint.

The periphery of the nut E may be roughened or many-sided; but I prefer to cast with the nut two projecting wings, $k\,k$, in order that the nut may be easily turned.

To open the jaws for the insertion of a tool, the nut E is screwed back, the sleeve D following the nut, owing to the wedge-like action of the beveled shoulders $h$ and $j$. The outer ends of the jaws will separate by reason of the action of the springs $c\,c$ on the inner ends of the jaws, the pin $d$ serving as the pivot on which the jaws swing.

When the stem $x$ of the tool has been inserted into the recess $b$ of the jaws, the threaded nut E is screwed up, pushing the sleeve D onto the shoulders $h$ of the jaws, and closing the same upon the tool.

It will be understood that the shell A can be secured to a bit-stock or to the spindle of a lathe or drilling-machine, as well as to a handle.

As the sleeve D has no rotary movement, there is not that excessive wear of the shoulders $h$ and $j$ which would be caused if said sleeve were rotated during the compression of the jaws B. Moreover, the shoulder $j$ may be less in diameter than the threaded portion of the shell, as the sleeve D can be applied to the jaws before the latter are applied to the shell.

The parts of the improved tool-holder can be readily put together, as no riveting of the pin $d$ is necessary, the nut E retaining said pin in place.

I claim as my invention—

1. The combination, in a tool-holder, of the threaded hollow shell with beveled gripping-jaws pivoted therein, the circular compressing-sleeve having an annular beveled portion adapted to bear upon said beveled portions of the jaws, and a nut applied to the thread on the shell and serving to impart longitudinal movement to the compressing-sleeve, said sleeve being independent of the nut in order to seat itself upon the jaws, substantially as described.

2. The combination, in a tool-holder, of the hollow shell, the gripping-jaws pivoted therein, the compressing-sleeve having a beveled bearing upon the jaws, and a conical rear end with a threaded compressing-nut having a conical recess, into which the rear end of the compressing-sleeve extends, substantially as and for the purpose specified.

3. The combination of the hollow shell, the transverse pivot-pin, and the gripping-jaws having semicircular recesses for the reception of said pivot-pin, all substantially as specified.

4. The combination of the hollow shell, the transverse pivot-pin, and the gripping-jaws having semicircular recesses for the reception of the pivot-pin, and projecting bearing-lugs, that of one jaw projecting into a recess in the other jaw, all substantially as specified.

5. The gripping-jaw having a recess for the reception of the stem of the tool, a recess in the rear thereof, semicircular recesses in the side walls of said rear recesses, and a bearing-lug projecting upward adjacent to one of said side walls, all substantially as specified.

6. The combination of the hollow shell, the transverse pivot-pin, the gripping-jaws having semicircular recesses for the reception of said pin, springs contained in recesses near the rear ends of the jaws and bearing against the inside of the hollow shell, the compressing-sleeve having a beveled bearing upon the jaws, and the nut adapted to an external thread on the shell and bearing upon the end of the compressing-sleeve, all substantially as specified.

In testimony whereof I have signed my name to this specification in the presence of two subscribing witnesses.

ADOLPH RIPPIEN.

Witnesses:
WILLIAM D. CONNER,
HARRY SMITH.